(12) United States Patent
Meunier et al.

(10) Patent No.: US 8,552,093 B2
(45) Date of Patent: Oct. 8, 2013

(54) ADMIXTURE FOR A HYDRAULIC BINDER

(75) Inventors: Laurent Meunier, Bourgoin-Jallieu (FR); David Rinaldi, Lyons (FR); Hakimi Yahiaoui, Mions (FR); Jean-Michel Faure, Oullins (FR)

(73) Assignee: Lafarge Gypsum International, Paris (FR)

( * ) Notice: Subject to any disclaimer, the term of this patent is extended or adjusted under 35 U.S.C. 154(b) by 71 days.

(21) Appl. No.: 12/997,048

(22) PCT Filed: Jun. 10, 2009

(86) PCT No.: PCT/FR2009/000687
§ 371 (c)(1),
(2), (4) Date: Dec. 9, 2010

(87) PCT Pub. No.: WO2010/004107
PCT Pub. Date: Jan. 14, 2010

(65) Prior Publication Data
US 2011/0086947 A1    Apr. 14, 2011

(30) Foreign Application Priority Data
Jun. 12, 2008   (FR) ..................... 08 03256

(51) Int. Cl.
*C08G 63/692*   (2006.01)
*C08G 65/00*    (2006.01)
*C08G 69/42*    (2006.01)

(52) U.S. Cl.
USPC ................. 524/3; 524/361; 524/363

(58) Field of Classification Search
USPC .................. 524/5, 3; 528/361, 363
See application file for complete search history.

(56) References Cited

U.S. PATENT DOCUMENTS

| | | | | |
|---|---|---|---|---|
| 5,256,746 A | * | 10/1993 | Blankenship et al. | 526/233 |
| 2002/0099115 A1 | * | 7/2002 | Shibai et al. | 524/2 |
| 2003/0153651 A1 | * | 8/2003 | Bonetto et al. | 524/2 |
| 2003/0175478 A1 | * | 9/2003 | Leclercq | 428/105 |

FOREIGN PATENT DOCUMENTS

| | | |
|---|---|---|
| DE | 10127060 | 12/2002 |
| EP | 011581 | 5/1980 |
| EP | 1052232 | 11/2000 |
| EP | 1209133 | 5/2002 |
| FR | 2230600 | 12/1974 |

OTHER PUBLICATIONS

Machine translation of FR 2230600. Dec. 20, 1974.*
International Search Report for PCT/FR2009/000687.

* cited by examiner

*Primary Examiner* — John Uselding
(74) *Attorney, Agent, or Firm* — Pillsbury Winthrop Shaw Pittman, LLP

(57) ABSTRACT

A method of using an admixture in hydraulic binders, in particular in plaster-based or anhydrous calcium sulphate-based compounds, the admixture being an acrylic polymer with controlled end chains.

23 Claims, 1 Drawing Sheet

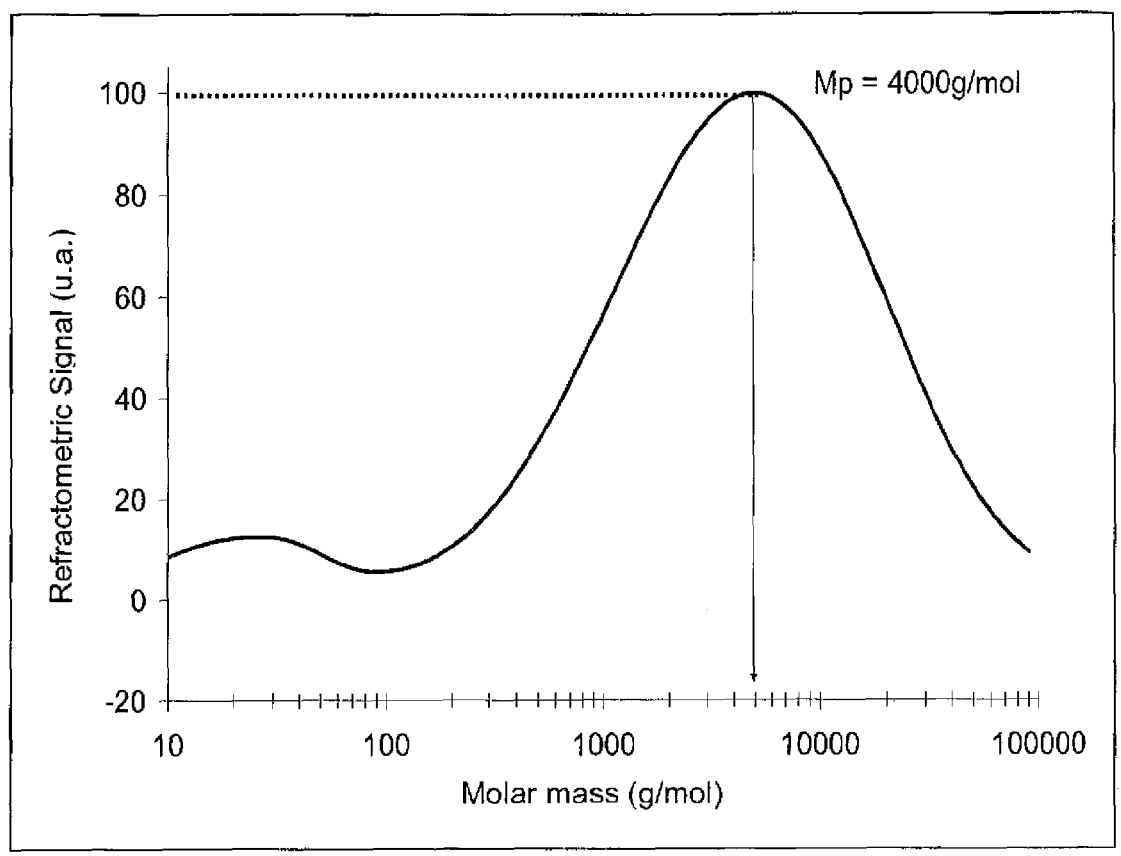

ADMIXTURE FOR A HYDRAULIC BINDER

CROSS-REFERENCE TO RELATED APPLICATIONS

This is the U.S. National Stage of PCT/FR2009/000687, filed Jun. 10, 2009, which in turn claims priority to French patent application Ser. No. 08/03256, filed Jun. 12, 2008, the entire contents of all applications are incorporated herein by reference in their entireties.

The present invention relates to the use of an admixture in hydraulic binders, in particular in plaster-based compounds or anhydrous calcium sulphate-based compounds.

The current plaster-based compounds generally contain various additives or admixtures which make it possible to control the setting of the compound and optionally the rheology of the compound. In particular, it is interesting for manufacturers to propose ready-mix compounds in the form of liquid or semi-liquid slurry in which the hydration of the calcium sulphate is blocked by blocking agents. The advantage of this type of ready-mix compound is that the user does not need to mix the water and the plaster (mixing). This blocking enables the compound to remain in a liquid or semi-liquid slurry form and not to harden in its packaging. Therefore, the user of the compound will have to deblock the plaster to enable the uptake of hydration by adding a deblocking agent.

The use of acrylic polymers is known to block plaster-based compounds or anhydrous calcium sulphate-based compounds.

However, when an improvement of the blocking performances of these polymers is desired, the usual practice consists of increasing the quantity of polymers.

In order to respond to users' requirements, it has become necessary to find a better-performing means of blocking the plaster-based or anhydrous calcium sulphate-based compounds, in particular for long blocking times (for example more than a year).

Therefore, the problem which the invention intends to solve is to provide a new admixture suitable for increasing the blocking time of hydraulic binder compositions.

Unexpectedly, the inventors have shown that it is possible to modify the end chains of acrylic polymers to obtain a useful admixture as a blocking agent for hydraulic binders, having improved blocking performances.

With this aim, the present invention proposes using at least one polymer or a salt thereof as an admixture for hydraulic binders, the said polymer being of formula (I)

$$Z-P-Z' \quad (I)$$

in which

Z is an end chain and represents a hydrogen atom, a hypophosphite group or a phosphonate group;

Z' is an end chain and represents a hypophosphite group or a phosphonate group;

P represents a component comprising at least one moiety of formula (II)

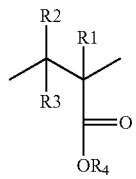

(II)

in which

R1, R2 and R3 independently represent a hydrogen atom, a linear or branched $C_1$ to $C_{20}$ alkyl radical, or a —$(CH_2)_p$—COOR radical or an ionized form thereof where p is equal to 0 or 1, and R is a hydrogen atom or R is a $C_1$ to $C_6$ alkyl radical;

R4 represents a hydrogen atom, a monovalent, divalent or trivalent ion, or a quaternary ammonium radical;

and optionally comprising at least one moiety of formula (III)

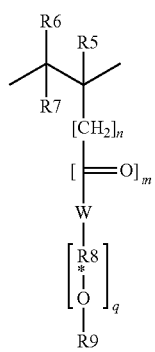

(III)

R5, R6 and R7 independently represent a hydrogen atom, a linear or branched $C_1$ to $C_{20}$ alkyl radical, or a —$(CH_2)_n$-$(C=O)_m$—W—$(R8\text{-}O)_q$—R9 radical;

R8 represents a linear or branched $C_2$ to $C_{20}$ alkyl radical;

R9 represents a hydrogen atom, or a linear or branched $C_1$ to $C_{20}$ alkyl radical;

W represents an oxygen or nitrogen atom;

n is an integer comprised from 0 to 2;

m is an integer equal to 0 or 1;

q is an integer comprised from 0 to 200;

and in which the degree of polymerisation is comprised from 5 to 200.

The invention also proposes a hydraulic binder comprising at least the said polymer or a salt thereof, as well as the use of this hydraulic binder to make a jointing compound.

Finally, the invention provides a jointing compound comprising at least the said polymer or a salt thereof.

The invention offers determining advantages, in particular the admixture according to the present invention makes it possible to block the hydration of the calcium sulphate for at least six months, twelve months, eighteen months, even twenty-four months, depending on the amount of admixture used.

Another advantage of the present invention is that the admixture, according to the invention, has a better blocking efficiency for a same dosage and for an identical molar mass, compared to known blocking agents.

Another advantage of the present invention is that the admixture according to the invention may be used at lower dosages for a same blocking efficiency, compared to known blocking agents with the same molar mass.

According to a variant of the present invention the admixture makes it possible, by virtue of its fluidizing property, to formulate compounds using reduced amounts of water compared with the amounts conventionally used.

On another hand according to a variant of the present invention, the admixture can be used as a blocking agent and fluidizing agent, thereby avoiding the use of two different additives to obtain the same result. The admixture according to the invention can be described as a <<2-in-1>> product.

Furthermore, according to a variant, the admixture according to the invention has the advantage of being able to be used only as a fluidizing agent.

Finally, the invention has the advantage of being able to be used in all industries, in particular the building industry, the chemical industry (admixture producers) and applied to all the construction markets (building, civil engineering or precast plants), to the construction industry of plaster elements or the cement industry.

Other advantages and characteristics of the invention will clearly appear after reading the following description and the examples provided for non-limiting illustration and non restrictive purposes.

The term <<binder>>, is to be understood according to the present invention as any component having the property of introducing cohesion to the formulation in which it is incorporated, and which makes it possible to provide mechanical characteristics to the said formulation (for example compressive strength, tensile strength, adherence). This binder is intended to bind inert elements such as aggregates.

The term <<hydraulic binder>>, is to be understood according to the present invention as any component which has the property of becoming hydrated in the presence of water and the hydration of which makes it possible to obtain a solid having mechanical characteristics. The term "hydraulic binder" also denotes hydric binders.

The term <<compound>>, is to be understood according to the present invention as a semi-liquid formulation, which, after implementation, will acquire mechanical properties. By way of example of a compound, mention may be made of compounds for stopping, filling, jointing, skimming or finishing.

The term <<admixture>>, is to be understood according to the present invention as any component, which, incorporated into a formulation, makes it possible to introduce particular properties.

The term <<blocking agent>>, is to be understood according to the present invention as any admixture making it possible to prevent the setting of a hydraulic binder, during a period of at least six months, in particular at least twelve months, by using a sufficient amount of blocking agent.

The term <<fluidizing agent>>, is to be understood according to the present invention as any admixture making it possible to fluidize.

The term <<transfer agent>>, is to be understood according to the present invention as a molecule which reacts with a growing polymer to stop its propagation, by generating a reactive entity capable of re-initiating a new polymerisation.

The term <<deblocking agent>>, is to be understood according to the present invention as any admixture which makes it possible to suppress the blocking action of the blocking agent. By way of a suitable deblocking agent according to the invention, mention may be made of aluminium, calcium, zinc, copper or iron salts, sulphuric acid, hydrochloric acid, sodium hydrogen sulphate, potassium hydrogen sulphate, aluminium potassium sulphate and mixtures thereof. The deblocking agent may be used in the powder form, liquid form or impregnated onto tape.

The term <<setting>>, is to be understood according to the present invention as the change to the solid state by chemical reaction.

The term <<degree of polymerisation (DPn)>>, is to be understood according to the present invention as the degree of polymerisation as defined in the "*Compendium of Chemical Terminology*>> published by The International Union of Pure and Applied Chemistry (IUPAC). The degree of polymerisation is the average number of monomer moieties per polymer chain as calculated by the formula: DPn=Mn/M0 where Mn is the average molar mass in number of the polymer and M0 is the molar mass of the repeated monomer moiety.

The present invention relates to the use of at least one polymer or a salt thereof as an admixture for hydraulic binders, the said polymer being of formula (I)

in which
Z is an end chain and represents a hydrogen atom, a hypophosphite group or a phosphonate group;
Z' is an end chain and represents a hypophosphite group or a phosphonate group;
P represents a component comprising at least one moiety of formula (II)

in which
R1, R2 and R3 independently represent a hydrogen atom, a linear or branched $C_1$ to $C_{20}$ alkyl radical, or a —$(CH_2)_p$—COOR radical or an ionized form thereof where p is equal to 0 or 1, and R is a hydrogen atom or R is a $C_1$ to $C_6$ alkyl radical;
R4 represents a hydrogen atom, a monovalent, divalent or trivalent ion, or a quaternary ammonium radical;
and optionally comprising at least one moiety of formula (III)

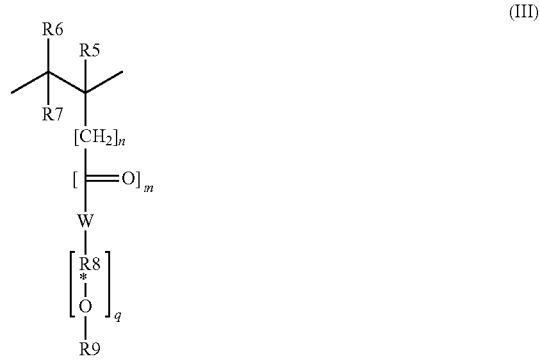

R5, R6 and R7 independently represent a hydrogen atom, a linear or branched $C_1$ to $C_{20}$ alkyl radical, or a —$(CH_2)_n$—$(C=O)_m$—W—$(R8\text{-}O)_q$—R9 radical;

R8 represents a linear or branched $C_2$ to $C_{20}$ alkyl radical;
R9 represents a hydrogen atom, or a linear or branched $C_1$ to $C_{20}$ alkyl radical;
W represents an oxygen or nitrogen atom;
n is an integer comprised from 0 to 2;
m is an integer equal to 0 or 1;
q is an integer comprised from 0 to 200;
and in which the degree of polymerisation is comprised from 5 to 200.

Preferably, the degree of polymerisation is comprised from 5 to 100, and more preferably from 5 to 50.

Preferably, the polymer according to the present invention or a salt thereof is used as a blocking agent and optionally fluidizing agent.

Preferably, the polymer according to the present invention or a salt thereof is used for the hydraulic binders selected from plasters, cements, mortars, concretes or anhydrous calcium sulphate-based binders.

In particular, the polymer according to the present invention or a salt thereof is used for plasters with a base of hemihydrated calcium sulphate (α or β).

Preferably, the polymer according to the invention or a salt thereof has a Z radical representing a hydrogen atom.

Preferably, the polymer according to the invention or a salt thereof has a Z' radical representing a hypophosphite group.

According to a variant, the polymer according to the invention or a salt thereof has a Z' radical representing a phosphonate group.

Preferably, the polymer according to the invention or a salt thereof has a R1 radical representing a hydrogen atom.

Preferably, the polymer according to the invention or a salt thereof has a R2 radical representing a hydrogen atom.

Preferably, the polymer according to the invention or a salt thereof has a R3 radical representing a hydrogen atom.

Preferably, the polymer according to the invention or a salt thereof has a R4 radical representing a hydrogen atom.

Preferably, the polymer according to the invention or a salt thereof has a R5 radical representing a hydrogen atom.

Preferably, the polymer according to the invention or a salt thereof has a R6 radical representing a hydrogen atom.

Preferably, the polymer according to the invention or a salt thereof has a R7 radical representing a hydrogen atom.

Preferably, the polymer according to the invention or a salt thereof has an atom W representing an oxygen atom.

Preferably, the polymer according to the invention or a salt thereof has a R8 radical representing a $C_2$ alkyl radical.

Preferably, the polymer according to the invention or a salt thereof has a R9 representing a $C_1$ alkyl radical or a hydrogen atom.

Preferably, the polymer according to the invention or a salt thereof has an integer n comprised from 0 to 1.

Preferably, the polymer according to the invention or a salt thereof has an integer q comprised from 2 to 100, preferably from 2 to 50, advantageously from 4 to 25.

In particular, the polymer according to the invention or a salt thereof may be used to block a hydraulic binder, in particular plaster-based compounds.

Preferably, the polymer according to the invention or a salt thereof is very particularly suitable to block and optionally control, after deblocking, the fluidity of previously blocked plaster-based compounds.

More particularly, according to a variant, the polymer according to the invention makes it possible to formulate compounds containing less water and to control the fluidity of the said compound after deblocking.

The polymer according to the invention or a salt thereof can have a varied chemical structure. In particular, the distribution of moieties (II) and (III) within the polymer can vary from one molecule to another. In particular, the polymer according to the invention can have a block, statistic, alternating or gradient structure.

The term "block structure" is to be understood according to the invention as a structure comprising distinct blocks of each of the monomer moieties.

The term "statistic structure" is to be understood according to the invention as a structure comprising the monomer moieties distributed statistically or randomly in the polymer chain.

The term "alternating structure" is to be understood according to the invention as a structure in which the monomer moieties alternate in the polymer chain.

The term "gradient structure" is to be understood according to the invention as a structure in which the concentration of each monomer moiety varies in a manner inversely proportional to one another.

Preferably, the polymer according to the invention has a statistic structure.

Preferably, the relative proportions of moieties (II) relative to moieties (III) in the polymer can range from 1/99 to 100/0 in proportion to units of moieties.

Preferably the relative proportion of moieties (II) relative to moieties (III) is comprised from 70/30 to 100/0.

More preferably, the relative proportion of moieties (II) relative to moieties (III) is comprised from 80/20 to 100/0.

According to a variant of the invention, the relative proportion of moieties (II) relative to moieties (III) is comprised from 80/20 to 99/1.

According to another variant of the invention, the relative proportion of moieties (II) relative to moieties (III) is 100/0.

The polymer according to the invention or a salt thereof has a degree of polymerisation comprised from 5 to 200, preferably from 5 to 100, and even more preferably from 5 to 50.

The polymer according to the invention or a salt thereof has a molar mass comprised from 350 to 50 000 daltons. For example when the polymer according to the invention comprises only moieties (II) the molar mass is comprised from 350 to 15 000, more particularly from 350 to 7 500 daltons, preferably from 350 to 3 750 daltons.

The polymer according to the invention may be completely or partially in the form of salts or in acid form. Suitable salts or ions according to the invention may be chosen from bases or mixtures of bases known to the person skilled in the art, for example sodium hydroxide, potassium hydroxide, calcium hydroxide or a primary, secondary or tertiary amine, or metals as described in the Periodic Table of the Elements, in particular, the alkali metals or the alkaline-earth metals. Other metals, such as the transition metals may also be suitable.

The polymers are obtained by (co)polymerisation, preferably radical copolymerisation of appropriate monomers. The (co)polymerisation can be carried out in a conventional manner for the person skilled in the art.

The term <<(co)polymerisation>> is to be understood according to the present invention as polymerisation or copolymerisation.

Preferably, the polymer according to the present invention is prepared from acrylic acid monomers.

The concentration of polymer according to the invention in the formulation depends on the intended application. The polymer according to the invention can be used in the form of a liquid solution, for example an aqueous solution, in the form of a dispersion, or in the form of a powder. Preferably, the polymer according to the invention or a salt thereof is used at a concentration of from 0.01 to 10%, preferably from 0.1 to 5%, even more preferably from 0.2 to 2% by dry weight of polymer relative to the dry weight of hydraulic binder.

Finally, the formulated polymer may be used alone or in combination with one or more other admixtures such as an accelerator, a retarder, a thickener, a rheological agent or optionally another dispersant, in order to adjust the rheological and setting properties of the material.

The invention also provides a hydraulic binder comprising at least one polymer or a salt thereof according to the invention, the said polymer being of formula (I)

in which

Z is an end chain and represents a hydrogen atom, a hypophosphite group or a phosphonate group;

Z' is an end chain and represents a hypophosphite group or a phosphonate group;

P represents a component comprising at least one moiety of formula (II)

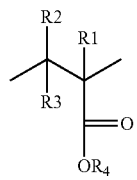

in which

R1, R2 and R3 independently represent a hydrogen atom, a linear or branched $C_1$ to $C_{20}$ alkyl radical, or a —$(CH_2)_p$—COOR radical or an ionized form thereof where p is equal to 0 or 1, and R is a hydrogen atom or R is a $C_1$ to $C_6$ alkyl radical;

R4 represents a hydrogen atom, a monovalent, divalent or trivalent ion, or a quaternary ammonium radical;

and optionally comprising at least one moiety of formula (III)

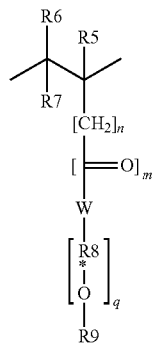

R5, R6 and R7 independently represent a hydrogen atom, a linear or branched $C_1$ to $C_{20}$ alkyl radical, or a —$(CH_2)_n$—(C=O)$_m$—W—(R8-O)$_q$—R9 radical;

R8 represents a linear or branched $C_2$ to $C_{20}$ alkyl radical;

R9 represents a hydrogen atom, or a linear or branched $C_1$ to $C_{20}$ alkyl radical;

W represents an oxygen or nitrogen atom;

n is an integer comprised from 0 to 2;

m is an integer equal to 0 or 1;

q is an integer comprised from 0 to 200;

and in which the degree of polymerisation is comprised from 5 to 200.

The polymer according to the invention or a salt thereof can be incorporated into the hydraulic binder in the form of a powder, a liquid solution or a dispersion.

The hydraulic binder according to the invention may be used to prepare a jointing compound.

The concentration of polymer according to the invention in the compound depends on the intended application. Preferably the polymer according to the invention or a salt thereof will be used at a concentration comprised from 0.01 to 5%, preferably from 0.02 to 2%, advantageously from 0.02 to 1% by weight of polymer relative to the weight of the compound.

The hydraulic binder according to the present invention may be used in particular to prepare a jointing compound.

The invention further relates to a jointing compound comprising at least one polymer of formula (I) or a salt thereof, or obtained from a hydraulic binder comprising at least one polymer of formula (I) or a salt thereof

in which

Z is an end chain and represents a hydrogen atom, a hypophosphite group or a phosphonate group;

Z' is an end chain and represents a hypophosphite group or a phosphonate group;

P represents a component comprising at least one moiety of formula (II)

in which

R1, R2 and R3 independently represent a hydrogen atom, a linear or branched $C_1$ to $C_{20}$ alkyl radical, or a —$(CH_2)_p$—COOR radical or an ionized form thereof where p is equal to 0 or 1, and R is a hydrogen atom or R is a $C_1$ to $C_6$ alkyl radical;

R4 represents a hydrogen atom, a monovalent, divalent or trivalent ion, or a quaternary ammonium radical;

and optionally comprising at least one moiety of formula (III)

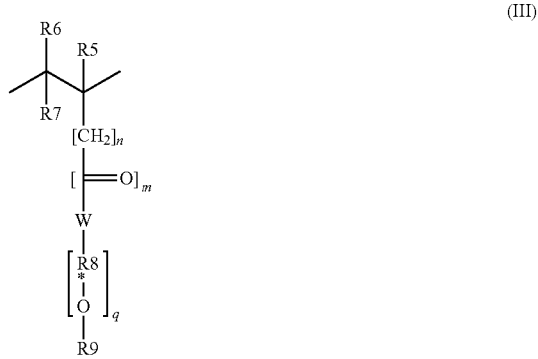

R5, R6 and R7 independently represent a hydrogen atom, a linear or branched $C_1$ to $C_{20}$ alkyl radical, or a —($CH2$)$_n$-(C=O)$_m$—W—(R8-O)$_q$—R9 radical;

R8 represents a linear or branched $C_2$ to $C_{20}$ alkyl radical;

R9 represents a hydrogen atom, or a linear or branched $C_1$ to $C_{20}$ alkyl radical;

W represents an oxygen or nitrogen atom;

n is an integer comprised from 0 to 2;

m is an integer equal to 0 or 1;

q is an integer comprised from 0 to 200;

and in which the degree of polymerisation is comprised from 5 to 200, preferably from 5 to 100, and even more preferably from 5 to 50.

BRIEF DESCRIPTION OF THE DRAWING(S)

FIG. 1 represents an example of a chromatogram (intensity of the signal according to the molar mass), obtained to determine the molar mass at the peak of the curve for a polymer of mass Mp=4000 g/mol.

The following examples illustrate the invention without limiting the scope thereof.

EXAMPLES

Experimental Conditions to Determine Molar Masses

The polymers were analyzed by size exclusion chromatography (SEC or GPC). The molar masses were determined in comparison to a calibration with sodium polyacrylate (Polymer Laboratories). Information relating to the equipment and analysis conditions is given in the following table:

|  | Aqueous GPC |
|---|---|
| Waters 515 HPLC Pump | |
| Waters 517plus Autosampler | injection T°: ambient |
| Waters 2410 Refractive Index Detector | sensor T°: 35° C. |
| 3 columns of Aquagel in series: mixed, OH40 and OH30 | columns T°: 35° C. |
| Eluent | Ultra pure aqueous solution of $NaNO_3$ at 0.1N; $NaH_2PO_4$ 0.01N neutralisation at pH = 7 with NaOH Flow 1 mL/min |

The chromatography provided a chromatogram of the type in FIG. 1 (intensity of the signal as the function of the molar mass). The molar mass at the peak of the curve (Mp) corresponded to the molar mass of the species giving the most intense signal.

Example 1

Synthesis of an Acrylic Acid Homopolymer with Hypophosphite End Chain(s)—Polymer 1

The following components were respectively weighed out into a 100 mL 3-neck flask:

10.1 g of acrylic acid 0.613 g of hydrated sodium hypophosphite 30 g of demineralised water.

The flask was then adapted to an assembly comprising a condenser, a nitrogen inlet and a temperature probe. The stirring was done magnetically. A water bath was installed under the flask and the temperature was set at 80° C. Once the set temperature was reached and the reaction medium was sufficiently degassed (15 min), 0.41 g of 4,4-Azobis(4-cyanovaleric acid) was added. The medium was maintained at 80° C. for two hours. Once cooled a clear, colourless aqueous solution of the polymer in solution was obtained.

The molar mass of the obtained polymer at the peak of the curve was 11600 g/mol (Mp).

All the manipulations were carried out according to this same operating procedure.

For the synthesis of copolymers, the second monomer can be added at the beginning when weighing the acrylic acid. A variant of the process could consist of adding the monomer(s) in a single step or in several steps.

According to the process, the transfer agent may be added at the beginning and/or in one or more steps. According to the masses of the target polymers, the quantity of transfer agent was adjusted and/or the synthesis process was modified: addition of the components continuously and/or discontinuously in one step or in several steps.

Example 2

Synthesis of an Acrylic Acid Homopolymer with Hypophosphite End Chain(s)—Polymer 2

The following components were respectively weighed out into a 100 mL 3-neck flask:

30 g of demineralised water.

1.97 g of hydrated sodium hypophosphite

The flask was then adapted to an assembly comprising a condenser, a nitrogen inlet and a temperature probe. The stirring was done magnetically. A water bath was installed under the flask and the temperature was set at 80° C. Once the set temperature was reached and the reaction medium was sufficiently degassed (15 min), the following two solutions were gradually added over two hours:

1—20.20 g of acrylic acid in 39.6 g of demineralised water

2—0.80 g of 4,4-Azobis(4-cyanovaleric acid), 20 g of demineralised water and 0.30 g of NaOH in pellets At the end of the pouring, the medium was maintained at 80° C. for one hour. Once cooled a clear, colourless aqueous solution of the polymer in solution was obtained.

The molar mass of the obtained polymer at the peak of the curve was 1710 g/mol (Mp).

Examples 3 to 5

Synthesis of Acrylic Acid Homopolymers with Hypophosphite End Chain(s)—Polymers 3 to 5

All the polymerisations presented in Table 1 were carried out according to the operating procedure in Example 1. Table 1 below gives the preparation conditions of polymers 3 to 5.

TABLE 1

| Example | Nature of the obtained polymer | Transfer Agent (TA) | % mol TA | Mass at the peak (Mp) |
|---|---|---|---|---|
| polymer 3 | polyacrylate with a Hypophosphite end chain | HPNa | 2 | 45630 |
| polymer 4 | polyacrylate with a Hypophosphite end chain | HPNa | 8 | 6964 |
| polymer 5 | polyacrylate with a Hypophosphite end chain | HPNa | 10 | 6525 |

Example 6

Synthesis of an Acrylic Acid-Based Copolymer and a Macromonomer of Formula (III) with Hypophosphite End Chain(S)—Polymer 6

The following components were respectively weighed out into a 100 mL 3-neck flask:
7.83 g of acrylic acid
2.82 g of AMPEG450
0.49 g of hydrated sodium hypophosphite
40.0 g of demineralised water.

The flask was then adapted to an assembly comprising a condenser, a nitrogen inlet and a temperature probe. The stirring was done magnetically. A water bath was installed under the flask and the temperature was set at 80° C. Once the set temperature was reached and the reaction medium was sufficiently degassed (15 min), 0.474 g of 4,4-Azobis(4-cyanovaleric acid) was added. The medium was maintained at 80° C. for two hours. Once cooled a clear, colourless aqueous solution of the polymer in solution was obtained.

The molar mass of the obtained copolymer at the peak of the curve was 45900 g/mol (Mp). The polymer contained on average 95% mol of acrylic acid moieties and 5% mol of AMPEG450 moieties.

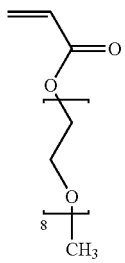

AMPEG450

Example 7

Synthesis of an Acrylic Acid-Based Copolymer and a Macromonomer of Formula (III) with Hypophosphite End Chain(s)—Polymer 7

The following components were respectively weighed out into a 100 mL 3-neck flask:
10 g of demineralised water.
0.757 g of hydrated sodium hypophosphite The flask was then adapted to an assembly comprising a condenser, a nitrogen inlet and a temperature probe. The stirring was done magnetically. A water bath was installed under the flask and the temperature was set at 80° C. Once the set temperature was reached and the reaction medium was sufficiently degassed (15 min), the following two solutions were gradually added over two hours:
1—7.70 g of acrylic acid and 2.80 g of AMPEG450 in 20 g of demineralised water
2—0.48 g of 4,4-Azobis(4-cyanovaleric acid), 20 g of demineralised water and 0.15 g of NaOH in pellets At the end of the pouring, the medium was maintained at 80° C. for one hour. Once cooled a clear, colourless aqueous solution of the polymer in solution was obtained.

The molar mass of the obtained polymer at the peak of the curve was 4000 g/mol (Mp).

Example 8

Synthesis of Acrylic Acid-Based Copolymers and a Macromonomer of Formula (III) with Controlled End Chain(S)—Polymer 8

All the polymerisations presented in Table 1 were carried out according to the operating procedure in Example 6. Table 2 below gives the preparation conditions of polymer 6

TABLE 2

| Example | Nature of the obtained polymer | Transfer Agent (TA) | % mol TA | Mass at the peak (Mp) |
|---|---|---|---|---|
| polymer 6 | Poly(AA-co-AMPEG450) (95/5) with a Hypophosphite end chain | HPNa | 8 | 34100 |

Example 9

Evaluation of the Blocking Effect of Polymers 1 to 5 on a Liquid Slurry of Hemi-Hydrate of Calcium Sulphate Calcium The blocking effect of polymers 1 to 5 was evaluated on a liquid slurry of hemi hydrate of calcium sulphate (HH) mixed at a Water/Powder ratio (W/P=0.60). The blocking time was visually evaluated. The plaster was a β plaster of natural origin from SELECTA. Two different dosages were tested.

Table 3 groups together the results of the blocking times obtained with polymers 1 to 5.

TABLE 3

| | Blocking time (months) Dosage = 0.1% weight/HH | Blocking time (months) Dosage = 0.2% weight/HH |
|---|---|---|
| polymer 1 | <0.1 | <0.1 |
| polymer 2 | 0.8 | 8.9 |
| polymer 3 | <0.1 | <0.1 |
| polymer 4 | <0.1 | 4.9 |
| polymer 5 | <0.1 | 5.8 |

For a 0.1% weight/HH dosage, the setting delay values less than one tenth of a month obtained for polymers 1, 3, 4 and 5 confirmed that the larger in size the polymers, the lower their retarding efficiency.

For a 0.2% weight/HH dosage, the trend was confirmed and polymer 2 offered the greatest blocking performance.

Example 9

Evaluation of the Blocking Effect of Polymers 6 to 8 on a Liquid Slurry of Hemi-Hydrate of Calcium Sulphate Calcium The blocking effect of polymers 6 to 8 was evaluated on a liquid slurry of hemi hydrate of calcium sulphate (HH) mixed at a Water/Powder ratio (W/P=0.60). The blocking time was visually evaluated. The plaster was a β plaster of natural origin from SELECTA. Two different dosages were tested.

Table 6 groups together the results of the blocking times obtained with polymers 1 to 17.

TABLE 6

|  | Blocking time (months) Dosage = 0.2% weight/HH | Blocking time (months) Dosage = 0.5% weight/HH |
|---|---|---|
| polymer 6 | 0.1 | 5.5 |
| polymer 7 | 2.2 | >8 |
| polymer 8 | 0.2 | 6.6 |

As with the homopolymers, the lower the molar mass of the copolymers, the greater their blocking power. The trend was verified for a low dosage (0.2% by weight/HH) and for a high dosage (0.5% by weight/HH).

The invention claimed is:

1. A method comprising adding at least one polymer or a salt thereof as an admixture to a hydraulic binder, said polymer being of formula (I)

$$Z—P—Z' \qquad (I)$$

in which
Z is an end of a chain and represents a hydrogen atom, a hypophosphite group or a phosphonate group;
Z' is an end of a chain and represents a hypophosphite group or a phosphonate group;
P represents a component comprising at least one moiety of formula (II)

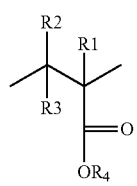

in which
R1, R2 and R3 independently represent a hydrogen atom, a linear or branched $C_1$ to $C_{20}$ alkyl radical, or a —$(CH_2)_p$—COOR radical or an ionized form thereof where p is equal to 0 or 1, and R is a hydrogen atom or R is a $C_1$ to $C_6$ alkyl radical;
R4 represents a hydrogen atom, a monovalent, divalent or trivalent ion, or a quaternary ammonium radical;
and optionally comprising at least one moiety of formula (III)

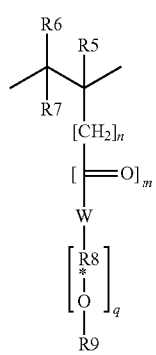

R5, R6 and R7 independently represent a hydrogen atom, a linear or branched $C_1$ to $C_{20}$ alkyl radical, or a —$(CH2)_n$—$(C=O)_m$—W—$(R8-O)_q$—R9 radical;
R8 represents a linear or branched $C_2$ to $C_{20}$ alkyl radical;
R9 represents a hydrogen atom, or a linear or branched $C_1$ to $C_{20}$ alkyl radical;
W represents an oxygen or nitrogen atom;
n is an integer comprised from 0 to 2;
m is an integer equal to 0 or 1;
q is an integer comprised from 0 to 200;
and in which the degree of polymerisation is comprised from 5 to 200,
wherein said polymer or a salt thereof is used as a blocking agent for blocking the setting of the hydraulic binder.

2. The method of claim 1, wherein said polymer or a salt thereof is used as a fluidizing agent.

3. The method of claim 1, wherein said polymer or a salt thereof is used for hydraulic binders selected from the group consisting of plasters, cements, mortars, concretes and anhydrous calcium sulphate-based binders.

4. The method of claim 1, wherein said polymer or a salt thereof is used for hemihydrated calcium sulphate-based plasters.

5. The method of claim 1, wherein R1 of formula II is a hydrogen atom.

6. The method of claim 1, wherein R2 of formula II is a hydrogen atom.

7. The method of claim 1, wherein R3 of formula II is a hydrogen atom.

8. The method of claim 1, wherein the Z radical of formula I is a hydrogen atom.

9. The method of claim 1, wherein the Z' radical of formula I is a hypophosphite group.

10. The method of claim 1, wherein the Z' radical of formula I is a phosphonate group.

11. The method of claim 1, wherein said polymer has a relative proportion of moieties (II) relative to moieties (III) ranging from 1/99 to 100/0 in proportion to units of moieties.

12. A hydraulic binder comprising at least one polymer according to claim 1.

13. A method comprising preparing a jointing compound with a hydraulic binder according to claim 12.

14. A jointing compound comprising at least one polymer according to claim 1.

15. A compound in a semi-liquid state, the compound comprising a hydraulic binder and at least one polymer or a salt thereof adapted to block a setting of the hydraulic binder, said polymer being of formula (I)

$$Z—P—Z' \qquad (I)$$

in which
Z is an end of a chain and represents a hydrogen atom, a hypophosphite group or a phosphonate group;
Z' is an end of a chain and represents a hypophosphite group or a phosphonate group;
P represents a component comprising at least one moiety of formula (II)

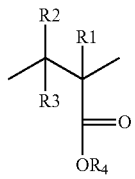

in which
R1, R2 and R3 independently represent a hydrogen atom, a linear or branched $C_1$ to $C_{20}$ alkyl radical, or a —(CH$_2$)$_p$—COOR radical or an ionized form thereof where p is equal to 0 or 1, and R is a hydrogen atom or R is a C$_1$ to C$_6$ alkyl radical;

R4 represents a hydrogen atom, a monovalent, divalent or trivalent ion, or a quaternary ammonium radical;

and optionally comprising at least one moiety of formula (III)

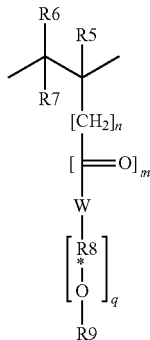

(III)

R5, R6 and R7 independently represent a hydrogen atom, a linear or branched C$_1$ to C$_{20}$ alkyl radical, or a —(CH2)$_n$-(C=O)$_m$—W—(R8-O)$_q$—R9 radical;

R9 represents a hydrogen atom, or a linear or branched C$_1$ to C$_{20}$ alkyl radical;

W represents an oxygen or nitrogen atom;

n is an integer comprised from 0 to 2;

m is an integer equal to 0 or 1;

q is an integer comprised from 0 to 200;

and in which the degree of polymerisation is comprised from 5 to 200.

16. The compound of claim 15, wherein the at least one polymer or a salt thereof is adapted to block the setting of the hydraulic binder during a period of at least six months.

17. The compound of claim 16, wherein the at least one polymer or a salt thereof is adapted to block the setting of the hydraulic binder during a period of at least twelve months.

18. The method of claim 1, wherein the at least one polymer or a salt thereof is added to block the setting of the hydraulic binder during a period of at least six months.

19. The method of claim 18, wherein the at least one polymer or a salt thereof is added to block a setting of the hydraulic binder during a period of at least twelve months.

20. A method for controlling a setting of a hydraulic binder, the method comprising blocking the setting of the hydraulic binder by incorporating at least one polymer or a salt thereof as an admixture to the hydraulic binder, said polymer being of formula (I)

Z—P—Z'    (I)

in which

Z is an end of a chain and represents a hydrogen atom, a hypophosphite group or a phosphonate group;

Z' is an end of a chain and represents a hypophosphite group or a phosphonate group;

P represents a component comprising at least one moiety of formula (II)

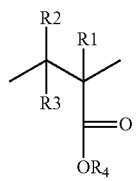

(II)

in which

R1, R2 and R3 independently represent a hydrogen atom, a linear or branched C$_1$ to C$_{20}$ alkyl radical, or a —(CH2)$_p$-COOR radical or an ionized form thereof where p is equal to 0 or 1, and R is a hydrogen atom or R is a C$_1$ to C$_6$ alkyl radical;

R4 represents a hydrogen atom, a monovalent, divalent or trivalent ion, or a quaternary ammonium radical;

and optionally comprising at least one moiety of formula (III)

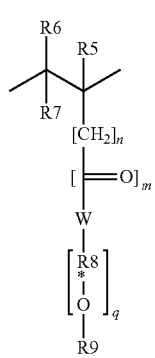

(III)

R5, R6 and R7 independently represent a hydrogen atom, a linear or branched C$_1$ to C$_{20}$ alkyl radical, or a —(CH2)$_n$-(C=O)$_m$—W—(R8-O)$_q$—R9 radical;

R8 represents a linear or branched C$_2$ to C$_{20}$ alkyl radical;

R9 represents a hydrogen atom, or a linear or branched C$_1$ to C$_{20}$ alkyl radical;

W represents an oxygen or nitrogen atom;

n is an integer comprised from 0 to 2;

m is an integer equal to 0 or 1;

q is an integer comprised from 0 to 200;

and in which the degree of polymerisation is comprised from 5 to 200.

21. The method of claim 20, wherein the at least one polymer or a salt thereof is adapted to block the setting of the hydraulic binder during a period of at least six months.

22. The method of claim 20, wherein the at least one polymer or a salt thereof is adapted to block the setting of the hydraulic binder during a period of at least twelve months.

23. The method of claim 20, wherein said polymer or a salt thereof is used as a fluidizing agent.

* * * * *